United States Patent [19]

Walters

[11] 4,039,213
[45] Aug. 2, 1977

[54] COUPLINGS

[76] Inventor: Tom Walters, 2102 Mason Blvd., Point Pleasant, W. Va. 25550

[21] Appl. No.: 665,109

[22] Filed: Mar. 8, 1976

[51] Int. Cl.² .................................... F16L 39/00
[52] U.S. Cl. .................................... 285/317; 285/13
[58] Field of Search .............. 285/13, 14, 305, 308, 285/313, 317, 404; 403/106

[56] References Cited

U.S. PATENT DOCUMENTS

| 1,098,265 | 5/1914 | James | 285/317 |
|---|---|---|---|
| 2,431,268 | 11/1947 | McIntyre | 285/317 |
| 2,677,560 | 5/1954 | Cornelius | 285/13 X |
| 3,796,448 | 3/1974 | Ringkamp | 285/317 |

Primary Examiner—G. V. Larkin

[57] ABSTRACT

A fluid conducting pressure locking O-ring element sealed hose coupling with automatic cocking/locking straight thrust insertion couple features and a push button couple release and safety vent innovation usable after the discharge of pressure within the coupled unit. Said coupling unit consists of tubular conduits that are swivelly coupled to each other by axially overlapping conduits that are axially directionally locked by a hook type flanged abutment pin slidably received radially by a positioning square opening within a fulcrum contained within a boss on the female member and maintained radially slidable by positioning square configurations and spring coils with outward extending arms. Said coils are received and maintained between said pin flanges. A slidable operating cap member is positioned and maintained by a retaining sleeve secured to said boss of the female member to where said spring arms are retained operable between the operating cap member and the fulcrum ring of the female member in a manner that when the male member is inserted within the female member at the couple procedure said pin is wedgingly forced radially outward by the bevelled configurations of the pin and the male member further deforming said attached spring coil arms until the engaging configurations of the male member passes under said pin. Then the spring deformed arms reacting forces return the pin radially inward to its seated normal station and locking abutment position of the interlocking parts. Then the subsequent uncouple procedure, when the force of pressure within the coupling is absent and the male member is further inserted into the female member to disengage the couple locking configurations, is accomplished by the operating cap being pushed radially inward to activate a cantilever action with said spring arms across the fulcrum ring to lift the locking pin radially outward to permit withdrawal of the coupled members one from the other.

19 Claims, 9 Drawing Figures

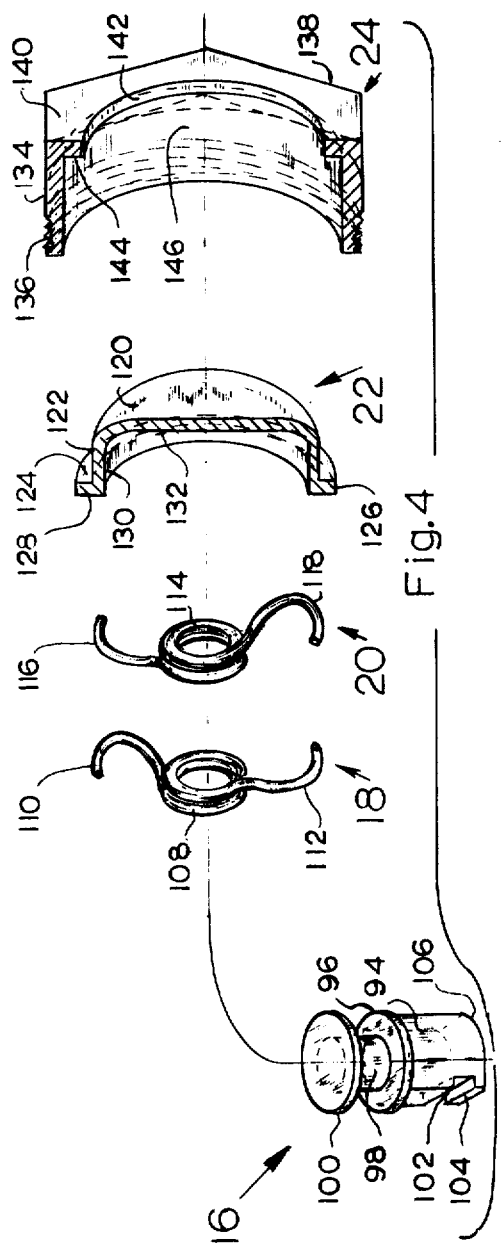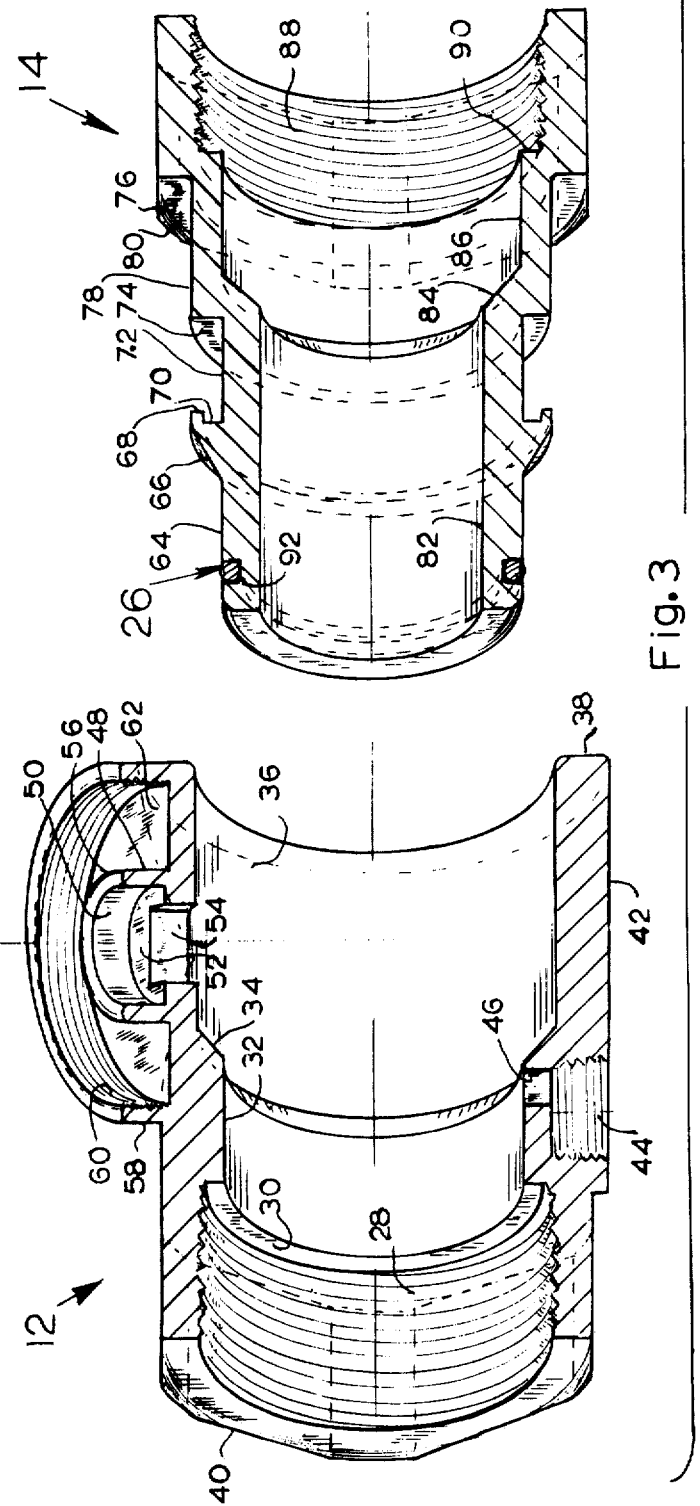

COUPLINGS

This invention relates in general to the coupling of tubular conduits and more particularly to a new and safely useful coupling assembly adapted to quickly and reliably couple and uncouple "limber hose" sections such as fire hose wherein pressurized fluid is conducted and be pressure locked by the internal axial column end force of the pressurized fluid being conducted within the coupled assembly.

Present coupling assemblies for industrial use and especially fire hose type coupling assemblies where several lengths of hose are coupled together or the end hand held where the hose is considered "limber" and unsupported creates a time consuming effort and the use of special wrenches in most cases to tighten components against compression seals when such time is of the essence. The possibility of cross threading coupling retaining nuts further tries a man's patience. When rolls of previously coupled hose lengths are unreeled for use the compression type seals may need retightening when internal pressure is applied. The absence of swivel action in the coupling could cause hose kinks with subsequent hose ruptures. While the dismantling of the hose sections may not need to be quick a better manner requiring no tools at uncoupling will be appreciated. The present invention will eliminate the above problems and provide innovations to improve the procedures in hose coupling and uncoupling.

It is therefore, an important object of the present invention to provide a coupling assembly embodying a simple rugged design that in addition being for high temperature, high pressure and high axial and torsional stress installation requirements, has pressure sealing and pressure locking features.

Further, to provide a design that automatically positions the couple parts of one member that upon a straight thrust insertion of the other member the two members are automatically axially locked together in a manner the couple configurations provide a full swivel of said members about their common axis to aid in eliminating hose kinks. More important, to provide a push button uncoupling operation with safety features preventing uncoupling the unit when appreciable pressure within the assembly is present, and to provide a safety vent to direct captive fluids harmlessly away as desired during the uncoupling procedure.

In accordance with the present invention, a female coupling member is provided with a boss having an inner recess within an annular threaded trunk with a standing fulcrum ring within the recess and a square opening within the fulcrum ring to radially slidably receive a lock pin. The lock pin has a groove and hook on the square end entering the square opening of the boss to subsequently engage an annular hook and groove on the male member upon the couple action. The lock pin also has a flange that limits its internal travel into the female member, a cylindrical section to receive coils of springs having outward extending arms ... and an end flange to retain the coils of said springs about the lock pin. A flanged operating cap is positioned onto said spring arm outer ends and maintained thereon by a retaining sleeve secured to said boss on the female coupling member. Said sleeve radially and slidably receives said operating cap which normally maintains said spring arms in contact with said fulcrum ring and seats the lock pin functional within the female coupling member which provides automatic cocking/locking upon the couple procedure.

The male coupling member with seal element secured may then be inserted into the female coupling member and be automatically locked in coupled position by its hook and groove formation as it subsequently engages the lock pin groove and hook formation. The thrust force of inserting said male member into the receiving chamber of the female member wedgingly pushed the lock pin radially outward until said male coupling member hook and groove formation passes under said lock pin. Then spring coils and arms action returns the lock pin groove and hook end back into the female member to lock position axially opposed to the hook and groove formation of the male member providing an interlocking engaging configuration. Accordingly, fluid pressure within the coupled assembly will tend to axially separate the coupling members and exert an axial column end force on the coupling locking hooks and grooves tightening the interlocking configurations to resist and prevent the radial force of pushing the operating cap radially inward to uncouple the conduit sections. In this manner a reliable pressure lock couple is provided as well as a simple push button uncouple procedure with the safety feature of said push button being functional to uncouple when appreciable internal pressure is absent and the male member can then be further inserted into the female member to disengage the interlocking parts of said pin and said male member.

These together with other objects and advantages which will become subsequently apparent reside in the details of construction and operations as more fully hereinafter described and claimed, reference being had to the accompanying drawings forming a part hereof, wherein like numerals refer to like parts throughout.

FIG. 3 is an exploded view, partly in section, of coupling members 12 and 14.

FIG. 4 is an exploded view, partly in section, of coupling members 16, 18, 20, 22, and 24.

Figure 1:
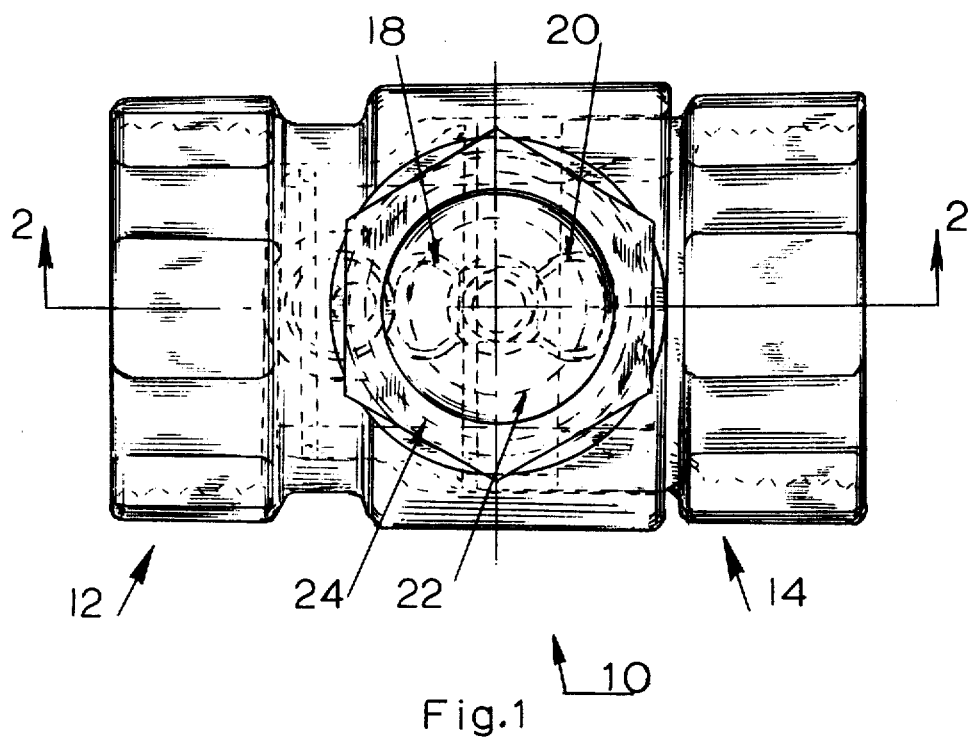
FIG. 1 is a plan view showing the assembled parts of the present invention.
Figure 2:
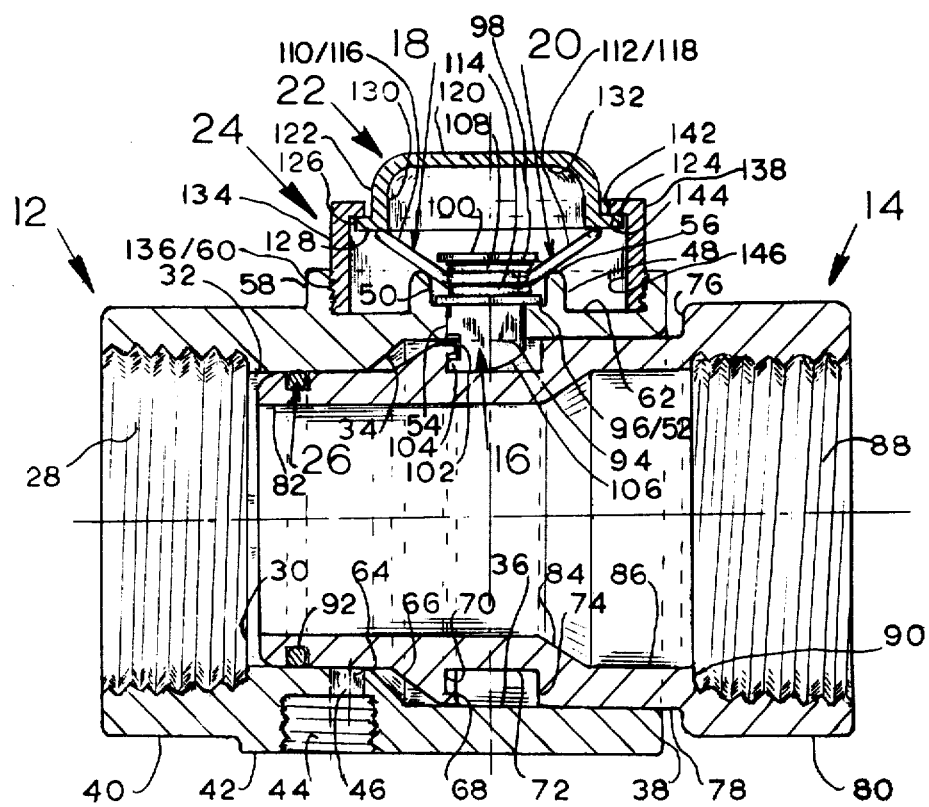
FIG. 2 is a side sectional view taken substantially through a plane indicated by section line 2—2 in FIG. 1 showing the assembled parts.

Referring now to the drawings in detail, FIGS. 1, 2, 3 and 4 show a typical coupling assembly 10 constructed in accordance with the present invention. The female tubular coupling member 12 and a male tubular coupling member 14 have threads 28 and 88 respectively as attachment ends for adjacent consuit sections. The female coupling member 12 has attachment threads 28 leading to shoulder 30 that begins internal cylindrical sealing surface 32 which leads to bevelled shoulder 34 that opens to cylindrical guide surface 36 ending at abutment end 38. Wrench fit hexagonal surface 40 begins the outer periphery of member 12 leading to cylindrical surface 42 which has pipe tap 44 leading to safety drain 46 from sealing chamber 32. Boss 58 on surface 42 has internal threads 60 for attaching retaining sleeve member 24, recess 62 leading inward to standing fulcrum ring 48 which has rounded contact rim 56 to receive contact of cantilever arms 110, 112 and 116, 118 of springs 18 and 20 respectively, cylindrical recess 50 for receiving flange 96 of lock pin 16, face 52 of recess 50 to limit radial inward travel of lock pin 16 at flange 96 or 16, square opening 54 in recess face 52 to slidably receive square shank 94 of lock pin 16. Lock pin 16 has groove 102 on one face of shank 94 providing hook formation 104 opposite contact and wedge easement bevel 106, cylindrical section 98 adjacent to flange 96 to receive coils 108 and 114 of coil/cantilever springs 18 and 20 respectively, and flange 100 for retaining said coils where the spring are further positioned as surface 128 of flange 126 of operating cap 22 contacts arms 110, 112 of spring 18 and arms 116, 118 of spring 20 in a manner permitting slidable lateral movement of the spring arm outer ends. Operating cap 22 has push button surface 120, outer cylindrical surface 122 slidable within opening 142 of flange 140 of retaining sleeve 24, surface 124 of flange 126 which contacts recessed surface 144 of retaining sleeve 24 to limit outward radial travel of cap 22, inner cylindrical clearance chamber 130 ending at surface 132.

When member 16 with member 18 and 20 are positioned into recess 54 of 12 and operating cap 22 is positioned and maintained by sleeve 24 so flange 126 of 22 is slidably received within cylindrical chamber 146 of sleeve 24 and said sleeve with threads 136 on cylindrical section 134 are engaged by the use of wrench fit hexagonal section 138 into threads 60 of boss 58 of female member 12, said female coupling member is assembled to receive the male coupling member 14 for the coupling procedure.

The male coupling member 14 has internal cylindrical flow area chamber 82 leading to bevelled shoulder 84 which enlarges into flow receiving chamber 86 to shoulder 90. Shoulder 90 leads radially outward to hose attachment threads 88 which are contained within wrench fit external hexagonal nut section 80 which leads to abutment face 76 adjacent to cylindrical surface 78 that has the lock pin annular receiving swivel provision groove 72 with stop face 74 the trailing end of said groove. Annular recess 70 forms annular hook 68 the leading end of said groove 72 where surface 78 continues on to conical shaped bevelled shoulder 66 that when subsequently contacting bevel 106 of lock pin 16 aids in push wedging said pin radially outward at the insertion of the male coupling member 14 into the female coupling member 12. Bevelled shoulder 66 leads inward to cylindrical surface 64 which contains groove 92 to retain O-ring seal element 26.

Figure 5:
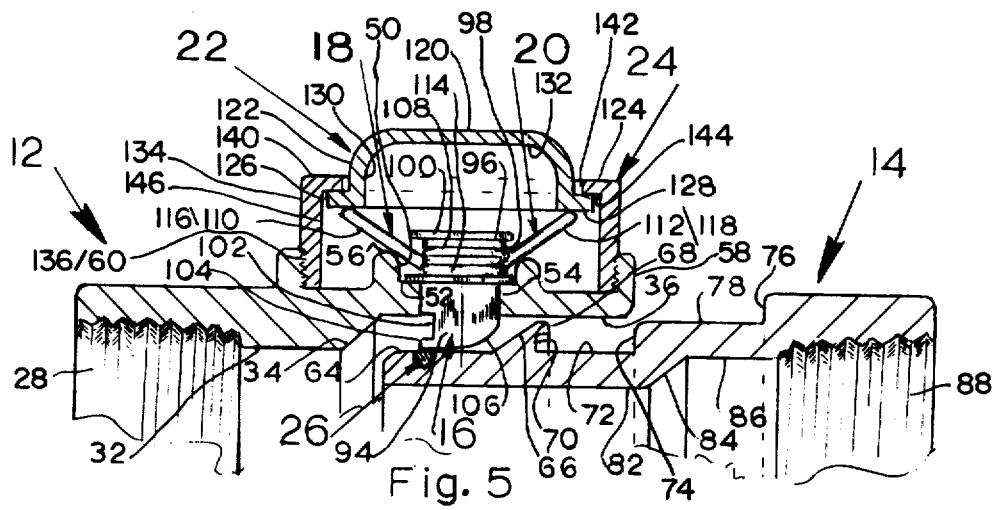
Figs. 5 through 7 are partial side sectional views showing the coupling assembly in different stages of coupling.
Figure 6:
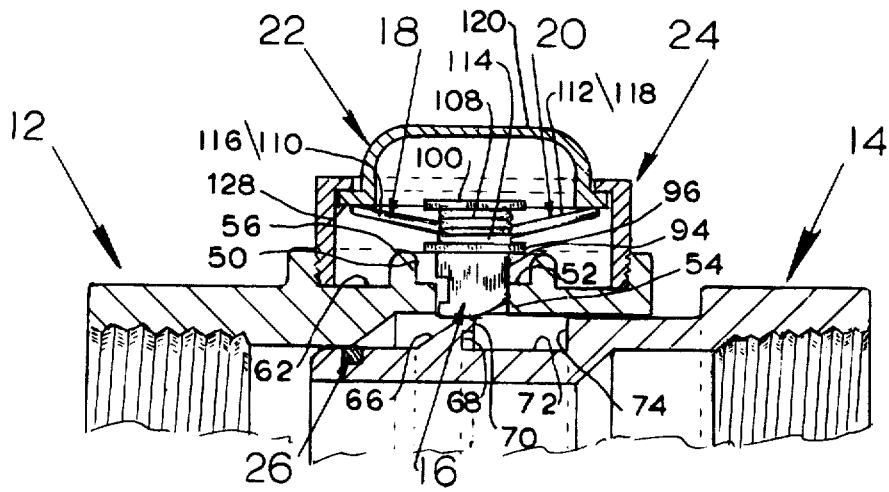
Figure 7:
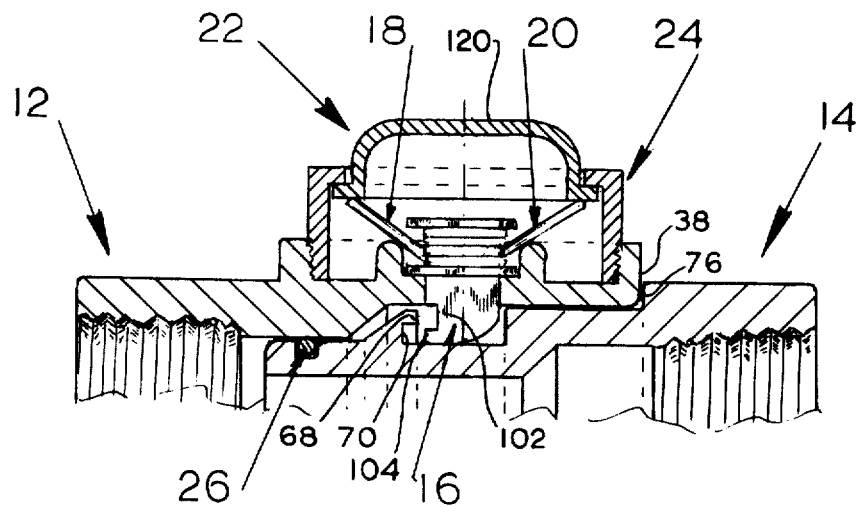

With the female coupling member 12 assembled complete with lock pin 16, coil/cantilever springs 18 and 20, operating cap 22 and retaining sleeve 24 positioned as previously explained and further shown in FIGS. 5, 6 and 7 which show the couple action in different stages of coupling when male coupling member 14 is slidably inserted into guide chamber 36 of female member 12, said female assembly is prepared for the following couple actions. Bevelled shoulder 66 of member 14 contacts bevel 106 of lock pin 16 radially outward so cylindrical surface 78 of 14 passes under said pin and arms 110 and 112 of spring 18, arms 116 and 118 of spring 20 being laterally slidably maintained at their outer ends by face 126 of operating cap 22 while coil 108 of spring 18 and coil 114 of spring 20 are retained about hub section 98 of lock pin 16 between flanges 96 and 100 of 16 that when pin 16 is lifted outward further deforming springs 18 and 20. Then, said springs reacting force returns pin 16 radially inward to lock position when hook 68 of male coupling member 14 passes under the pin 16 providing a lock position for the coupled unit. The male member 14 and female member 12 are free to swivel independently of each other yet be guided with close slidable tolerances between each other that insure a reliable O ring element seal 26. Further and firmer engagement of hook 68 of member 14 with groove 102 of 16, hook 104 of 16 with groove 70 of 14 occurs when pressure is induced within the coupled assembly since said pressure creates an inherent axial column end force, due to the pressured liquid flow area reductions and flow restraining piping/hose configurations that retain appreciable pressure within a piping/hose system even at full design flow of said liquid, that tends to axially separate the coupled members and in doing so locks said hook/-groove configurations tighter to eliminate the probability of uncoupling the unit while containing appreciable internal pressure. The economical and reliable O-ring element seal is made use of to permit the slidable action between the female and male coupling parts at coupling and pressure locking and also at uncoupling to be explained later. Compression type seals tend to leak as the internal pressure increases because of the column end force previously noted while O-ring seals and the line become tighter seals as the internal pressure is increased as applied herein.

Figure 8:
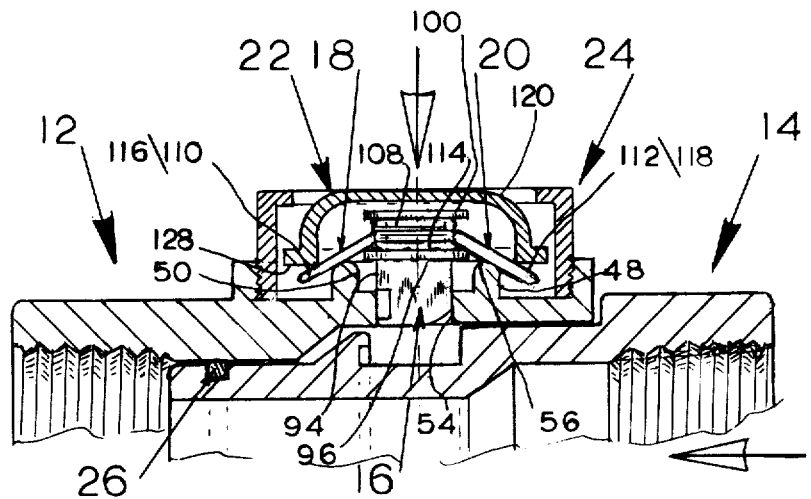
FIG. 8 and 9 are partial and side sectional views showing the coupling assembly in different stages of uncoupling.
Figure 9:
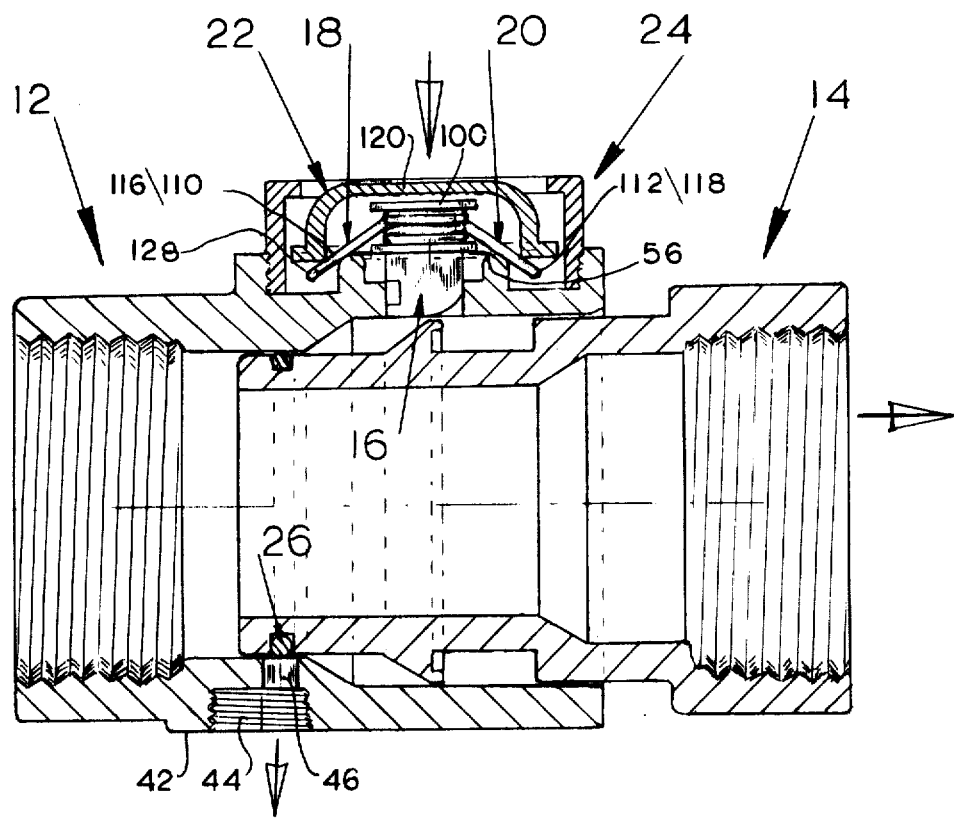

To uncouple the assembly when the internal pressure is removed as indicated in FIGS. 8 and 9 that show male coupling member 14 further inserted into chamber 32 of the female coupling member 12 to where hook 68 of 14 and hook 104 of pin 16 are free of grooves 102 and 70 the operating cap 22 is manually pushed radially inward with flange face 128 of 22 exerting the push force upon arms 110 and 116, arms 112 and 118 of coil/cantilever springs 18 and 20 respectively so said arms in contacting fulcrum ring 48 upon shoulder 56 evenly relay said push force upon coil 108 of 18 and upon coil 114 of 20 which are retained about hub 98 by flanges 96 and 100 of pin 16 to cantilever said pin radially outward so the male couple member 14 is free to be withdrawn.

The O-ring seal element 26 retains pipe line drainage and captive gases within the coupled assembly, particularly useful when the coupling assembly is used for other than water service, until as the male member is being withdrawn from the coupled assembly and seal element 26 passes over safety drain port 46 of the female coupling member 12. Such drainage and gases are then harmlessly directed through drain piping attached to threads 44 of member 12.

The foregoing is considered as illustrative only of the principles of the invention. Further, since numberous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a pair of axially overlapping conduit members with O-ring seal element at the seal area between the members and a safety drain opening on the outer member, where said conduit members are adapted to be rotatable relative to each other about a common axis, a coupling assembly with conduit and the like attachment ends comprising a lock pin element slidably positioned radially within a square opening within a standing fulcrum ring configuration recessed within a boss upon the outer conduit member where said lock pin protrudes radially inward through said opening to subsequently engagingly interlock an axially outward annular hook upon the inner member, facing the threaded conduit attachment end of said member, which is formed by an annular groove axially positioned to face said threaded end wherein said hook and said groove form the interlocking configuration that projects radially outward from the inner member, a pair of coil/cantilever springs, with centrally positioned coils having outward extending arms for the subsequent cantilever unit uncouple action, guided by their centrally positioned coils yoked to said lock pin while said spring arms extend radially outward over said fulcrum ring of said boss where said spring arms outer ends are guided and limited by an outwardly crowned operating cap, having a flange ring extending outward at the inner face of said cap that is positioned and radially slidably maintained within a retaining sleeve which is secured to said boss where said operating cap flange upon contacting said spring coil arms compressingly deform same at said securement whereupon said spring arms reacting forces normally maintain said operating cap to its radially outward limits against said retaining sleeve and in operating position as well as said reacting forces normally maintaining said lock pin to its radially inward limits due to the spring coils being yoked to said pin, whereupon the insertion of the inner conduit member into the outer conduit member wedges said lock pin radially outward momentarily after which the interlocking configurations of said pin and said inner member are engaged, providing a coupled position of the conduit members, whereupon uncoupling the conduit members is accomplished when said lock pin's interlock with said inner member is disengaged by further insertion of said inner member into said outer member by said operating cap being pushed radially inward in push button fashion so said spring coil arms are forced across said fulcrum ring exerting cantilever reaction force upon the coil centers of said springs yoked to said pin, lifting said pin radially outward out of lock position to permit the withdrawal of said inner member at uncoupling the assembly.

2. The combination of claim 1 wherein said inner conduit member includes an annular outward conical bevel section providing the configuration to cause the radially outward movement of said lock pin upon the insertion of said inner member into the outer conduit member providing a straight axial thrust insertion automatic couple action.

3. The combination of claim 1 wherein said lock pin includes a locking groove and hook formation for said engaging interlock with the hook and groove formation of the inner conduit member.

4. The combination of claim 1 wherein said lock pin is slidably positioned within a square opening of the outer conduit member said lock pin includes a square shank adapted to be fitted within said opening to guide and maintain other parts of its configurations functionally positioned, such as its groove and hook formation.

5. The combination of claim 1 wherein said lock pin includes a retaining and positioning flanged hub to maintain said spring coils in a manner so their extending arms are positioned with reacting forces upon the operating cap flange.

6. The combination of claim 1 wherein said lock pin includes an inward bevelled end to aid in wedging said lock pin radially outward against the springs reacting force at the thrust insertion couple action at coupling said members.

7. The combination of claim 1 where said interlocking engagement of said lock pin and said inner conduit member includes opposed hook and groove/ groove and hook configurations that will be further engagingly tightened as pressure is induced within the coupled assembly due to an axial column end force created by said pressure which tends to axially separate the coupling members while said interlocking engagement withstands said force, providing the coupled unit with a pressure locking safety feature.

8. The combination of claim 1 wherein said lock pin provides an axial containment abutment for said inner conduit member to normally prevent said member's withdrawal from the coupled position.

9. The combination of claim 1 wherein said interlocking engagement withstands said force whereupon said interlocking engagement of said lock pin and said inner conduit member provides the configurations to prohibit said lock pin's outward radial movement while the coupled assembled unit contains appreciable pressure and like directional separating axial forces.

10. The combination of claim 1 wherein said spring coil/arms include angular configurations that transmit reacting forces radially outward at said spring arms' outer ends that maintain the operating cap to its normal radially outward limit at couple procedures.

11. The combination of claim 1 wherein said coils/arms include angular configurations that transmit reacting forces radially inward at said centrally positioned coils that due to the spring coils being yoked to said lock pin return said lock pin to its normal radially inward limits at the finish of the couple action.

12. The combination of claim 1 wherein said spring arm outer ends include configurations permitting said ends to slide laterally at said cap flange providing the easement for said springs compression rate changes necessary during couple and uncouple actions.

13. The combination of claim 1 wherein said springs include coil/arms configurations permitting the outer ends of said spring arms to be moved radially inward where said arms are forced across said fulcrum ring to provide cantilever reacting force upon said spring coil centers where said coils are yoked to said lock pin lifting said pin radially outward to uncouple position.

14. The combination of claim 1 wherein said safety drain opening on the outer member includes an outer piping connection that provides a safety drain discharge that functions in conjunction with said seal element which is secured about the lapped member that upon withdrawing the lapped member from the coupled position said seal element maintains the seal between said overlapping members against leakage of possible slight pressure within a valved off section of hose, wherein said pressure is conceivably created by hot sun and other conditions heating a hose containing a film of volatile liquids, at said lapped member withdrawal up to said safety drain opening whereupon said pressure is directed through said safety drain and attached blow off piping as desired in a tattle tale manner.

15. The combination of claim 1 wherein said lock pin's interlock with said inner member is disengaged by further insertion of said inner member into said outer member prior to the subsequent uncoupling of the inner and outer conduit members whereupon said insertion requires a premeditated maneuver by the operator where said operator is further restrained from unsafely performing said insertion should the coupled assembled unit contain appreciable internal pressure creating axial forces tending to separate said unit because these forces are used to significantly prohibit said further insertion.

16. The combination of claim 1 wherein said spring coils include configurations for said springs reacting force control of the lock pin's alignment during said pin radially outward movement to provide an important aid in the automatic couple operation of the lapped conduit member insertion within the overlapping conduit member.

17. The combination of claim 1 wherein said springs coils include configurations for said springs reacting force control of the lock pin alignment during said pin's subsequent radially inward movement providing an important aid in the automatic couple operation of the lapped conduit member insertion within the overlapping conduit member.

18. the combination of claim 1 wherein said lock pin includes an abutment face limiting said pin's inward radial movement providing radial positioning for said pin at the automatic couple locking of the coupling assembly.

19. The combination of claim 1 wherein said hook and groove formation of the inner conduit member includes an annular recess to receive the lock pin hook and permit said lock pin to annularly move within said recess providing a swivel action of the coupled conduit members.

* * * * *